US005961288A

United States Patent [19]
René Legendre et al.

[11] Patent Number: 5,961,288
[45] Date of Patent: Oct. 5, 1999

[54] PROCESS FOR MANUFACTURING A COMPOSITE COMPONENT CAPABLE OF FLEXING AND TWISTING

[75] Inventors: Philippe Maurice René Legendre, Grans; Marc Pierre Christian Denante, Marseille, both of France

[73] Assignee: Eurocopter, Marignane Cedex, France

[21] Appl. No.: 08/978,047

[22] Filed: Nov. 25, 1997

[30] Foreign Application Priority Data

Nov. 26, 1996 [FR] France .................................. 94 14461

[51] Int. Cl.⁶ ............................................ B63H 1/26
[52] U.S. Cl. .................. 416/134 A; 416/230; 416/240; 416/229 R; 416/241 A
[58] Field of Search ............................. 416/134 A, 141, 416/230, 244 D, 244 R, 238; 264/136, 137, 156, 258

[56] References Cited

U.S. PATENT DOCUMENTS

| 3,265,554 | 8/1966 | Eldred . | |
|---|---|---|---|
| 3,669,566 | 6/1972 | Gaston et al. . | |
| 4,386,989 | 6/1983 | Aubry | 416/241 |
| 4,892,462 | 1/1990 | Barbier et al. | 416/230 |
| 4,898,515 | 2/1990 | Beno et al. | 416/134 A |
| 5,372,479 | 12/1994 | Byrnes et al. | 416/134 A |
| 5,454,693 | 10/1995 | Aubry et al. | 416/134 A |
| 5,462,408 | 10/1995 | Coffy | 416/134 A |

FOREIGN PATENT DOCUMENTS 0 402 309  12/1990  European Pat. Off. .
2 474 395   7/1981  France .

*Primary Examiner*—Edward K. Look
*Assistant Examiner*—Ninh Nguyen
*Attorney, Agent, or Firm*—Henderson & Sturm

[57] ABSTRACT

This process consists in making separately a set of individual plies consisting of rods impregnated with thermoplastic resin, in assembling several individual plies in order to form a rod bundle, in encasing at least the rods in at least one elastomer and in curing the injected elastomer. The ends of the rods have a rectangular shape, the rods having central parts joined to the ends by transition zones such that the surface area of the cross-section of the rods is constant and the length of the transition zone is very small. Cut pieces consisting of fibers, arranged on each side of the ends of the rods comprise fibers oriented at more or less 45 degrees to the longitudinal fibers of the rods.

20 Claims, 3 Drawing Sheets

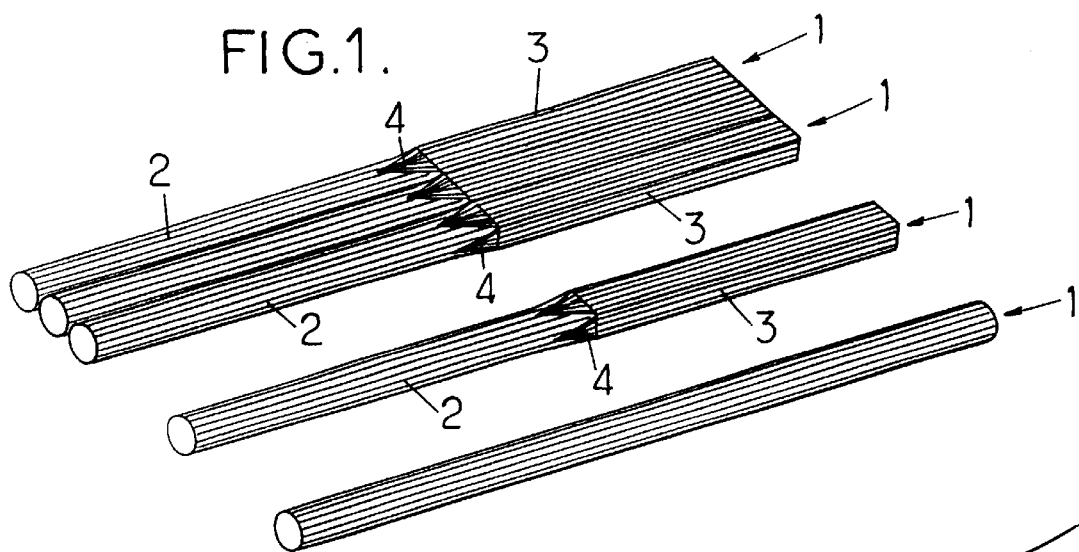
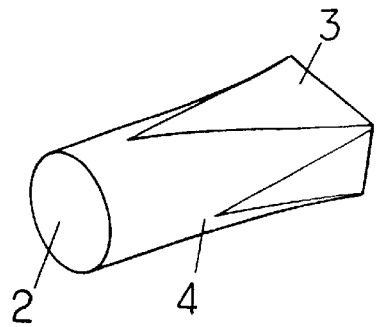
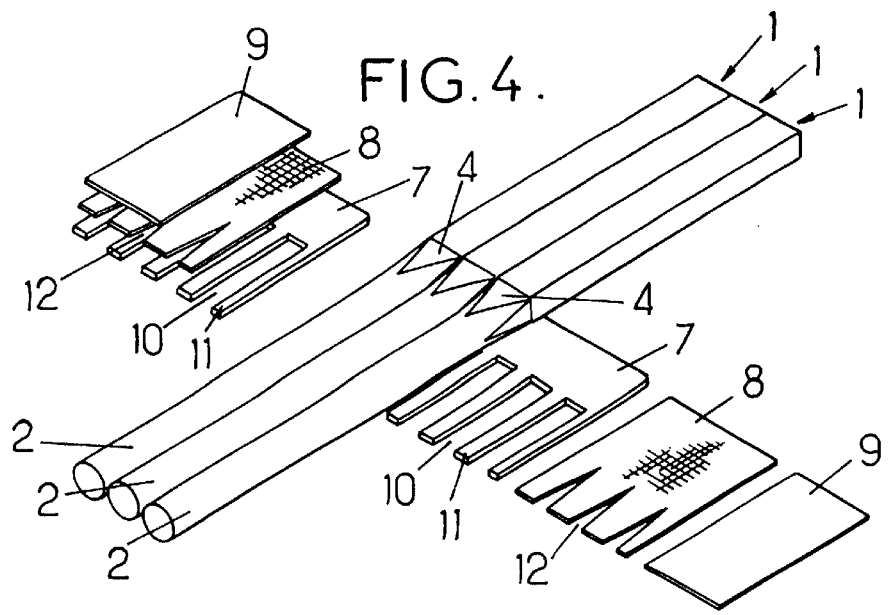

5,961,288

PROCESS FOR MANUFACTURING A COMPOSITE COMPONENT CAPABLE OF FLEXING AND TWISTING

FIELD OF THE INVENTION

The present invention relates to a process for manufacturing an elongate composite component capable of flexing and twisting, essentially consisting in its central part of rods of longitudinal fibers embedded in a resin and encased in a cured elastomer or of a star-shaped assembly of such components.

The process according to the present invention relates more particularly to the manufacture of an elastomeric arm capable of twisting and flexing, intended to provide the connection between a blade and a hub of a rotor, in particular a main rotor, of a rotary-wing aircraft so as to withstand the angular pitch movements and possibly also the angular flapping and drag movements of the blade which occur during the rotational movement of the rotor of the rotary-wing aircraft or helicopter.

BACKGROUND OF THE INVENTION

Processes for manufacturing such a composite component are already known, from Document FR-A-2,474,395, which comprise the steps consisting in:

making separately a set of individual plies, each individual ply being obtained by arranging rods of resin-impregnated fibers, preserved in the non-rigidified state, side by side in a manufacturing mould, the said rods of fibers having ends arranged between cut pieces consisting of layers of resin-impregnated fibers, the ply then being rigidified under pressure by heating followed by cooling:

assembling several individual plies in order to form a bundle of approximately uniformly spaced rods;

encasing at least the rods of fibers with at least one elastomer; and curing the injected elastomer in order to form the composite component capable of flexing and twisting.

In this process of the prior art, the step consisting in encasing at least the rods of fibers with at least one elastomer consists in injecting a single type of elastomer after having formed the bundle. This process does not make it possible to manufacture a component capable of twisting which has different characteristics depending on the functionalities of each of the regions of the bundle capable of twisting. Placing the rods of fibers in the mould requires means for positioning them inside this mould so as to obtain the optimum placement of the rods with respect to one another. However, this type of mould is expensive to manufacture.

In addition, the resin used is a thermosetting resin such as an epoxy.

Thermosetting resins are characterized by the fact that they cure by crosslinking or polymerizing, this constituting irreversible curing.

This irreversible curing means that the elastomeric arm capable of twisting and flexing is difficult to manufacture since the arm is made by complete or localized successive shapings and consolidations, and since it is impossible to compensate for or correct any manufacturing imperfection or imprecision, and hence there is a high scrap rate.

SUMMARY OF THE INVENTION

One object of the invention is to facilitate the manufacture and assembly of the rods of fibers in order to form a composite element, using simple, effective and inexpensive means.

Another object of the invention is to obtain a composite component having mechanical properties tailored to the functionalities of each of the portions of this component.

Yet another object of the invention is to make any modification of the constituent parts of the component, during their manufacture, easy.

For this purpose, according to the invention, the process for manufacturing the composite component capable of flexing and twisting, of the aforementioned type, is essentially characterized in that:

the ends of the rods have a cross-section of quadrangular shape, the rods having central parts joined to the ends by transition zones such that the surface area of the cross-section of the rods is constant and the length of the transition zone is very small compared to that of the rods; and the cut pieces consisting of layers of fibers, arranged on each side of the ends of the rods, comprise fibers oriented at more or less 45 degrees to the longitudinal fibers of the said rods.

The shape of the ends of the rods allows these rods to be positioned relative to one another without the need of special shapes of the mould.

The process according to the invention may optionally furthermore include one or more of the following characteristics:

the step consisting in encasing at least the rods comprises introducing at least one elastomer into each of the rigidified plies before assembling these plies together;

the step consisting in encasing at least the rods comprises alternately stacking rigidified plies and layers of at least one elastomer;

several elastomers, having different modulus, damping and environmental-resistance properties, are used;

the step consisting in encasing at least the rods comprises individually sheathing each rod with an elastomer;

the step consisting in encasing at least the rods comprises injecting an elastomer into the said bundle;

the elastomer is injected into the said bundle in the viscous state;

the resin used is a thermoplastic resin and the heating which helps to rigidify each ply is carried out at a melting temperature of the thermoplastic resin. Advantageously, the resin used makes it possible to carry out complete or localized successive shapings and consolidations during the manufacture of the component by successive meltings of the resin;

the step consisting in assembling several individual plies comprises melting the impregnation resin of the ends of the individual plies;

the step consisting in assembling several individual plies comprises the steps consisting in interposing films or powder of a thermoplastic resin between ends of the individual plies and then in pressing and heating the ends of the individual plies in order to melt the thermoplastic resin;

the step consisting in assembling several individual plies comprises the thermocompression bonding of the ends of the individual plies, an adhesive material being interposed between the ends of the said plies;

the rods and the cut pieces comprise carbon fibers and/or glass fibers;

the thermoplastic resin in which the rods and the cut pieces are embedded are of the polyetherether-ketone type called PEEK melting at approximately 380° C.;

the films or the powder which are interposed between the ends of the individual plies are made of a thermoplastic resin of the PEEK type;

the said adhesive material interposed between the ends of the individual plies is a thermoplastic resin of the polyetherimide type called PEI melting at approximately 300° C.;

the central parts of the rods have a circular cross-section and the cut pieces arranged on each side of the ends of the rods cover the transition zones, there being at least three pieces comprising, from the outside of the component to the rods, a solid cut piece, a cut piece having notches whose sides converge towards the inside of the said piece, and a cut piece having rectangular openings parallel to the central part of the rods, the said openings and the said notches lying opposite the transition zone of the rods;

the rectangular openings and the notches are intended to be filled with a filling film made of a thermoplastic resin; and the two ends of the stacked individual plies are pressed and heated one after the other in order to minimize the deformations of the central parts of the rods, the region of the transitions zones optionally being cooled, by blowing a gas, in order to avoid crushing the rods at the ends and to avoid deforming them in the central part.

The present invention furthermore relates to a rotary-wing aircraft rotor comprising a hub and blades and comprising at least one composite component capable of flexing and twisting according to any one of the preceding characteristics in order to provide the connection between at least one blade and the hub.

BRIEF DESCRIPTION OF THE DRAWINGS

An embodiment of the invention will now be described with regard to the appended drawings, in which:

FIG. 1 is a perspective view of a rod of longitudinal fibers before and after shaping, as well as three shaped rods placed side by side, only one half of the length of these rods being shown;

FIGS. 2 and 3 are respectively perspective and cross-sectional views of a transition region between a central part and one end of a rod of FIG. 1;

FIG. 4 is a partially exploded perspective view of the three shaped rods of FIG. 1, cut pieces according to the present invention being added to the ends of these three rods;

DETAILED DESCRIPTION OF THE PREFERRED EMBODIMENT

Figure 5:
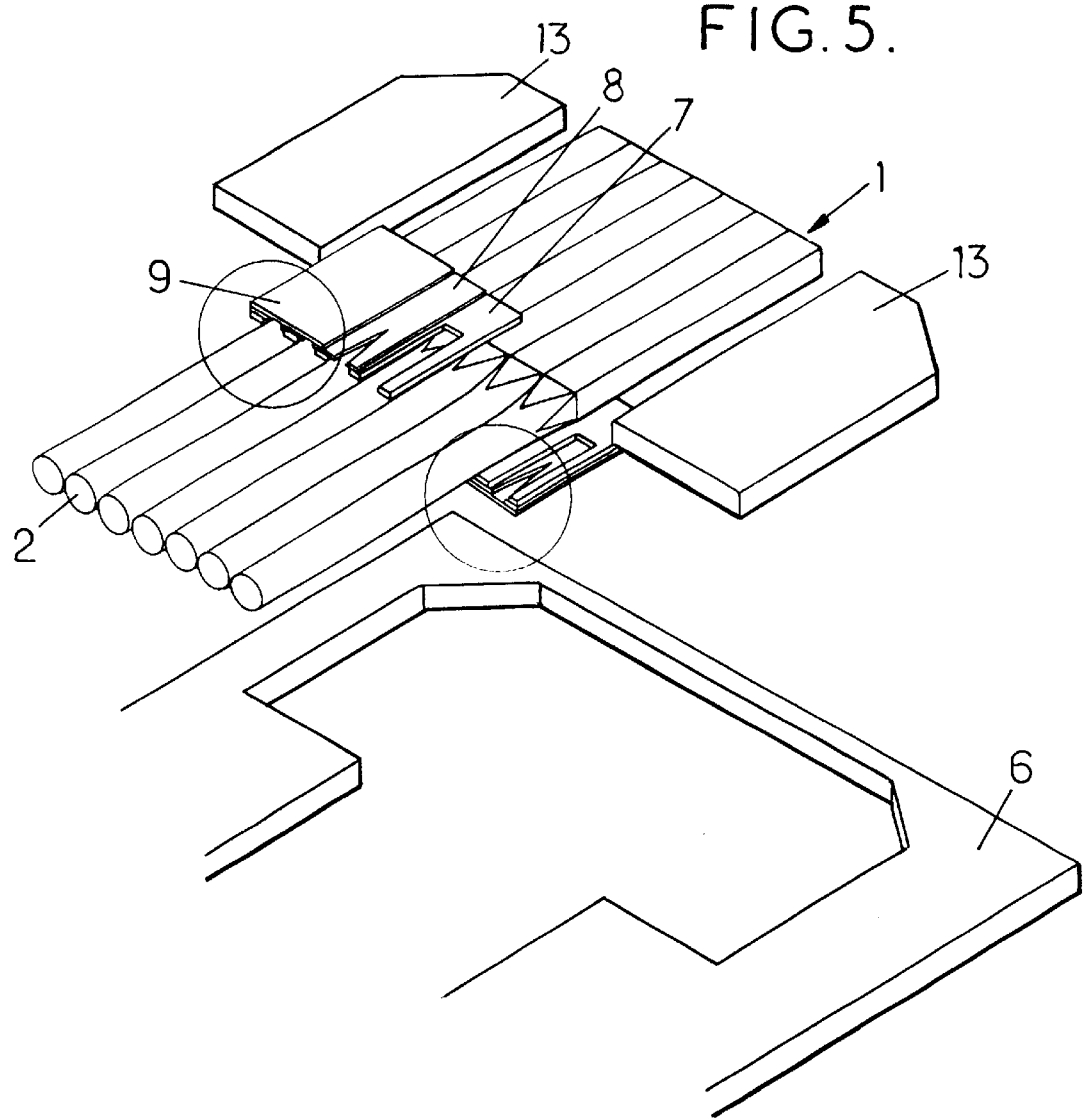
FIG. 5 is an exploded perspective view of the rods and of the cut pieces of FIG. 4 during the shaping in a manufacturing mould of an individual ply according to the present invention.
Figure 6:
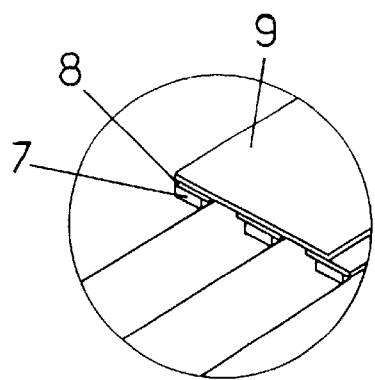
FIGS. 6 and 7 are respectively enlarged views, from above and from below, of details of the set of cut pieces positioned on the transition zones of the rods of FIG. 5.
Figure 7:
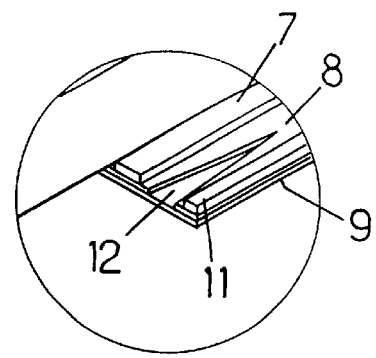

The process for manufacturing a composite component capable of flexing and twisting according to the present invention consists first of all in shaping the rods 1 of longitudinal fibers, as shown in FIG. 1. The rods 1 are made of glass or carbon fibers embedded in a resin, for example a thermoplastic resin of the polyetheretherketone type called PEEK. These rods are thermoformed at 380° C. under tension in a mould with two matched dies which is known per se (not shown). Each rod 1 has a central part 2 of circular cross-section connected to two ends 3 of quadrangular, preferably rectangular, cross-section by two transition zones 4 (only one end 3 and only one transition zone 4 being shown in the figures).

The transition zone 4, also shown in FIGS. 2 and 3, has a shape which changes from its circular cross-section where it connects to the central part of the rod to its rectangular cross-section where it connects to the corresponding end of the rod so that the surface area of its cross-section is constant. The length of this transition zone 4 is as short as possible, that is to say it has a length which is very small compared to the length of the rods 1. Preferably, the surface area of the cross-section of the rod is constant over the entire length of this rod.

In the present case, the rods have a central part 2 of cylindrical shape, but this central part 2 may have a cross-section of elliptical or even polygonal shape.

Figure 8:
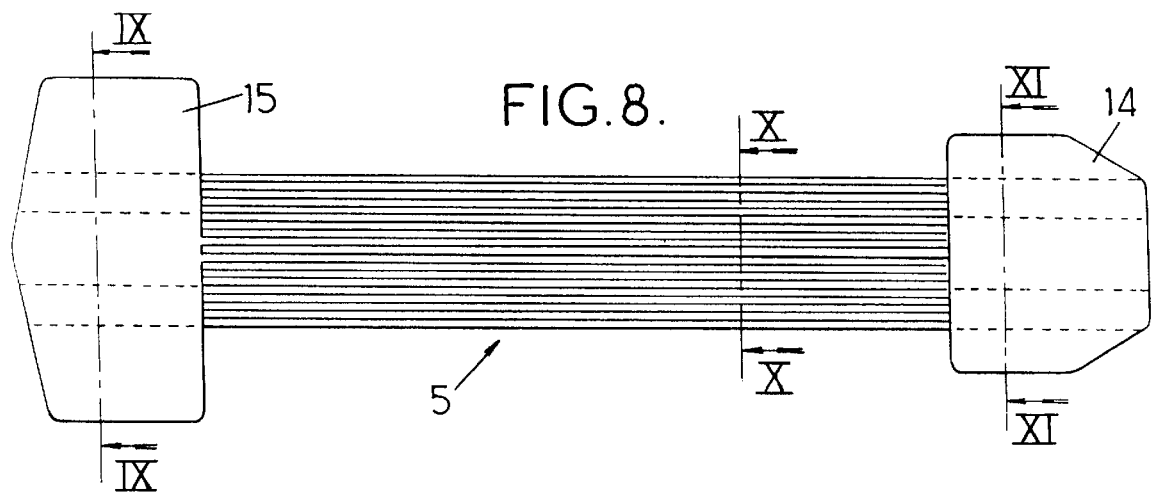
FIG. 8 is a view from above of an individual ply according to the present invention.

The process then consists in separately making a set of individual plies 5, like the one shown in FIG. 8, by arranging, as shown in FIGS. 4 to 7, rods 1, which are kept in the non-rigidified state, side by side in a manufacturing mould 6. Each individual ply 5 consists of a variable number of rods 1, for example from seven to nineteen, which are assembled at each end between two stacks of three cut pieces or cut-outs 7 to 9 which consist of layer of fibers.

The cut pieces 7 to 9 consist of layers of glass or carbon fibers impregnated with a resin, for example a thermoplastic resin of the PEEK type, the melting point of which is approximately 380° C. These layers take the form of plies or of cloths in which the fibers are oriented at more or less 45 degrees to the longitudinal direction of the rods 1.

Each cut piece 7, intended to come into contact with the transition zones 4 of the rods 1, has rectangular openings 10 parallel to the central part 2 of these rods so that these cut pieces 7 have arms 11 extending on each side of the central parts 2. Provided in the cut piece 8 are "VI" notches 12, these having a shape converging towards the inside of the cut piece and being intended to be opposite the openings 10 in the pieces 7. The cut piece 9 itself is solid. As a variant, the three cut pieces 7 to 9 also cover the ends 3 of the rods 1. The openings 10 and the notches 12 are intended to be filled with a filling film consisting of a resin, for example a thermoplastic resin of the PEEK type or of the polyetherimide type called PEI.

FIG. 5 shows, moreover, that end side-blocks 13, also made of glass fibers embedded in a resin, for example a thermoplastic resin, are placed on each side of the set of rods 1, each constituting an individual ply 5. Each side-block 13 may have a laminated structure consisting of superimposed glass-fibre cloth layers, the glass fibers being agglomerated by the resin.

All these rods 1, these cut pieces 7 to 9 and these side-blocks 13 are placed in the manufacturing mould 6 and put under pressure and raised in temperature in order for the thermoplastic resin to melt and thus to obtain an individual ply 5, as shown in FIG. 8, after cooling for rigidifying the resin. This individual ply 5 has differently shaped ends 14 and 15, their shape depending on the shape of the end side-blocks 13 placed on each side of the rods 1.

Figure 9:
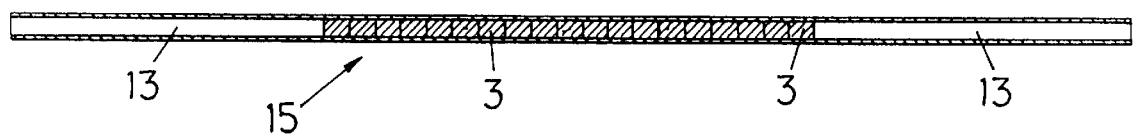
FIGS. 9, 10 and 11 are respectively sectional views on the lines IX—IX, X—X and XI—XI of FIG. 8.
Figure 10:
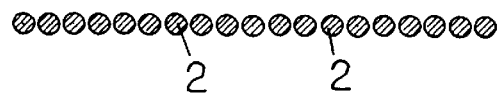
Figure 11:
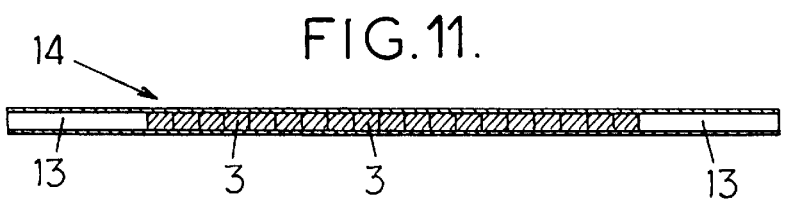

As shown in FIGS. 9 to 11, the ends 3 of the rods 1 are contiguous inside the ends 14 and 15 of the individual plies 5 while the central parts 2 of the rods 1 are spaced apart.

Figure 12:
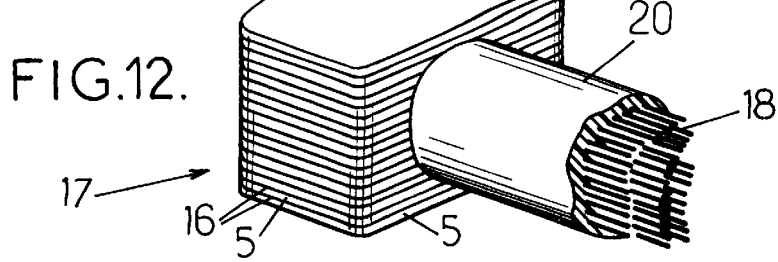
FIG. 12 is a view of an end part of the component capable of flexing and twisting according of the present invention.

The individual plies 5 thus formed are then stacked on top of one another, as shown in FIG. 12, interposing a film 16 of adhesive material, such as thermoplastic resin of the polyetherimide type, the melting point of which is approximately 300° C., between each of the ends 14 and 15 of these plies in order to form the component 17 capable of flexing and twisting. The stacked layers consisting, on the one hand, of the ends 14 and the films 16 and, on the other hand, of the ends 15 and the films 16 are pressed and heated in order to obtain the thermoplastic resin of the PEI type and thus to form a bundle 18 of rods 1 having, at each of its ends, a heel 19 for connecting the component 17 capable of flexing to external members. Preferably, the ends 14 and 15 are successively pressed and heated, one after the other, in order to minimize the deformations of the spanning parts 2 of the rods 1. In addition, the transition zones 4 are cooled by a jet of compressed air in order to prevent the central parts 2 from deforming. As a variant, it is possible to interpose films 16 of thermoplastic resin of the same kind as that of the individual plies, namely resin of the PEEK type in order to obtain, during the melting carried out at a temperature above 380° C, good homogeneity of the stack.

Next, an elastomer 20 is injected, preferably in the uncrosslinked state, into the bundle 18 of rods 1 and then cured, in order to give the component 17 capable of flexing and twisting its final shape. This uncrosslinked elastomer is injected in the viscous state.

As a variant, the heels 19 of the component 17 capable of flexing and twisting may be drilled by conventional machining and metal rings may be added and bonded to these heels 19 in order to form regions of attachment of this component 17 to a helicopter rotor hub and a helicopter blade.

In any one ply 5 there may be glass-fibre rods and carbon-fibre rods, the latter then being preferably arranged between the glass-fibre rods, and the plies having rods composed of two different types of fibers being preferably stacked between plies having only glass-fibre rods, so as to form a post capable of twisting and flexing, the carbon-fibre rods of which are in the middle of the bundle and are surrounded by glass-fibre segments.

In addition, the top and bottom plies of the stack may include the same side-by-side segments as the plies of the centre of the stack in order to give the arm capable of twisting and flexing a cross-section having a flattened cruciform general shape, which may be more appropriate to the desired deformations in torsion (for pitch control) and in differential flexure in flapping mode and in drag mode, when the arm is used to connect a rotor blade to a hub.

As variants, the step of injecting the elastomer 20 into the bundle 18 may be omitted and replaced by:

the introduction of one or more elastomers into each of the rigidified plies 5, before the latter have been assembled together; or an alternating stack of rigidified plies 5 and of layers of one or more elastomers 20, the rods being coated with the uncrosslinked elastomer during the compacting step necessary for assembling the plies; or else individual sheathing of each rod 1 with the elastomer 20, in particular in their central part 2, the rods then being consolidated at their ends 3, either ply by ply as described above or by moulding the complete bundle in a single operation. The elastomer used is, for example, either polyurethane poured hot into a mould for coating the rods—in this case it is uncrosslinked—or silicone, which is applied to the rods in the form of a sheet having a constant thickness by means of an adhesive—in this case this silicone is an at least partly cross-linked elastomer—all of the above then being put under pressure and raised in temperature in order to produce the assembly. When putting them in place, the edges of the silicone sheet overlap in order to form an overvolume. Complementary injection of silicone at a very high pressure may prove to be necessary.

In the two first variants, several elastomers having different (modulus, damping or environmental—resistance) properties may be used in each of the portions of the plies in order to obtain a composite component even better suited to its future use. These elastomers are introduced in the uncrosslinked state.

In particular, it is thus possible to produce bundles capable of twisting having an optimized distribution of stiffness and damping, for example in order to reduce the stresses in the region where the rods are embedded.

In addition, during the final moulding, an additional injection of the same elastomer, or of a different elastomer, may be carried out in order, in particular, to control the pressure and/or to produce an external coating for protection or for retention.

We claim:

1. Process for manufacturing an elongate composite component capable of flexing and twisting, essentially consisting of rods of longitudinal fibres embedded in a resin and encased in at least one cured elastomer, the process comprising the steps consisting in:

making separately a set of individual plies, each individual ply being obtained by arranging rods of resin-impregnated fibres, preserved in the non-rigidified state, side by side in a manufacturing mould, said rods of fibers having ends arranged between cut pieces consisting of layers of resin-impregnated fibres, which are arranged on each side of the ends of the rods, and which comprise fibres oriented at more or less 45 degrees to longitudinal fibers of the rods, the ply then being rigidified under pressure by heating followed by cooling;

assembling several individual plies in order to form a bundle of approximately uniformly spaced rods;

encasing at least the rods of fibres in said at lease one elastomer;

curing the injected elastomer in order to form the composite component capable of flexing and twisting;

wherein the ends of the rods have a cross-section of quadrangular shape, the rods having central parts joined to the ends by transition zones having a shape which changes its circular cross-section where it connects to the central part of the rod to its rectangular cross-section where it connects to the corresponding end of the rod so that the surface are of its cross-section is constant, such that the surface area of the cross-section of the rods is constant and the length of the transition zone is very small compared to that of the rods; and wherein the cut pieces consisting of layers of fibres, are into contact with the transition zones of the rods.

2. Process according to claim 1, wherein the step consisting in encasing at least the rods comprises introducing at least one elastomer into each of the rigidified plies before assembling these plies together.

3. Process according to claim 1, wherein the step consisting in encasing at least the rods comprises alternately stacking rigidified plies and layers of at least one uncrosslinked elastomer.

4. Process according to claim 2, wherein several elastomers, having different modulus, damping and environmental-resistance properties, are used.

5. Process according to claim 1, wherein the step consisting in encasing at least the rods comprises individually sheathing each rod with an elastomer.

6. Process according to claim 1, wherein the step consisting in encasing at least the rods comprises injecting an elastomer into the said bundle.

7. Process according to claim 6, wherein the elastomer is is injected into the said bundle in the viscous state.

8. Process according to claim 1, wherein:

the resin used is a thermoplastic resin; and the heating which helps to rigidify each ply is carried out at a melting temperature of the thermoplastic resin.

9. Process according to claim 1, wherein the step consisting in assembling several individual plies comprises melting the impregnation resin of the ends of the individual plies.

10. Process according to claim 1, wherein the step consisting in assembling several individual plies comprises the steps consisting in interposing films or powder of a thermoplastic resin between ends of the individual plies and then in pressing and heating the ends of the individual plies in order to melt the thermoplastic resin.

11. Process according to claim 1, wherein the step consisting in assembling several individual plies comprises the thermocompression bonding of the ends of the individual plies, an adhesive material being interposed between the ends of the said plies.

12. Process according to claim 1, wherein the rods and the cut pieces comprise at least one of carbon fibres and glass fibres.

13. Process according to claim 1, wherein the thermoplastic resin in which the rods are embedded and the cut pieces are of the polyetheretherketone type called PEEK melting at approximately 380° C.

14. Process according to claim 10, wherein the films or the powder which are interposed between the ends of the individual plies are made of a thermoplastic resin of the PEEK type.

15. Process according to claim 11, wherein the said adhesive material interposed between the ends of the individual plies is a thermoplastic resin of the polyetherimide type called PEI melting at approximately 300° C.

16. Process according to claim 1, wherein the central parts of the rods have a circular cross-section and the cut pieces arranged on each side of the ends of the rods cover the transition zones, there being at least three pieces comprising, from the outside of the component to the rods, a solid cut piece, a cut piece having notches whose sides converge towards the inside of the said piece, and a cut piece having rectangular openings parallel to the central part of the rods, said openings and said notches lying opposite the transition zone of the rods.

17. Process according to claim 16, wherein the rectangular openings and the notches are intended to be filled with a filling film made of thermoplastic resin.

18. Process according to claim 2, wherein the two ends of the stacked individual plies are pressed and heated one after the other in order to minimize the deformations of the central parts of the rods, the region of the transitions zones optionally being cooled, by blowing a gas, in order to avoid crushing the rods at the ends and to avoid deforming them in the central part.

19. Rotary-wing aircraft rotor having a hub and blades, said rotary-wing aircraft rotor comprising at least one composite component produced by the process of claim 1 capable of flexing and twisting and intended for providing the connection between at least one blade and the hub.

20. Process according to claim 3, wherein several elastomers, having different modulus, damping and environmental-resistance properties, are used.

* * * * *

UNITED STATES PATENT AND TRADEMARK OFFICE
CERTIFICATE OF CORRECTION

PATENT NO. : 5,961,288
DATED : October 5, 1999
INVENTOR(S) : Philippe Maurice Rene LEGENDRE et al.

It is certified that error appears in the above-identified patent and that said Letters Patent is hereby corrected as shown below:

On title page, item 30 Foreign Priority Data
replace "94 14461"
with --96 14461--.

Signed and Sealed this

Eighteenth Day of April, 2000

Attest:

Q. TODD DICKINSON

*Attesting Officer*     *Director of Patents and Trademarks*